Figure 1:
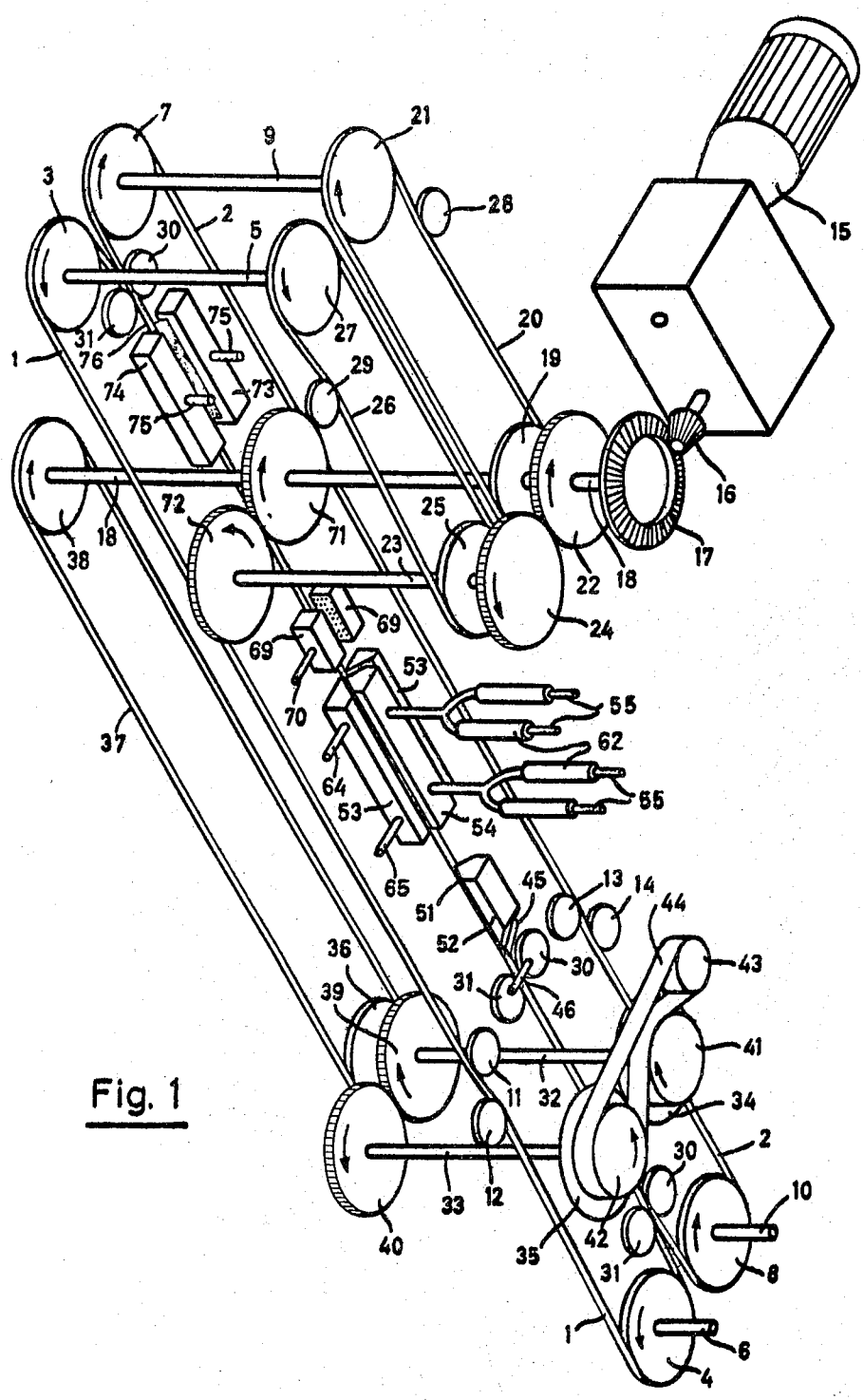

United States Patent [19]

Imhagen et al.

[11] 3,855,037

[45] Dec. 17, 1974

[54] MANUFACTURE OR CLOSING OF SACKS BY WELDING CUT LENGTHS OF TUBE OF THERMOPLASTICS

[75] Inventors: Karl-Heinz Imhagen, Limburgerhof; Werner Kasper, Frankenthal; Gernot Manhart, Limburgerhof; Werner Weidner, Ludwigshafen, all of Germany

[73] Assignee: Badische Anilin- & Soda-Fabrik Aktiengesellschaft, Ludwigshafen/Rhine, Germany

[22] Filed: July 30, 1970

[21] Appl. No.: 59,529

[30] Foreign Application Priority Data

Aug. 4, 1969 Germany.......................... 1939571

[52] U.S. Cl.................. 156/497, 156/82, 156/211, 156/259, 156/260, 156/267, 156/282, 156/498, 156/510, 156/512

[51] Int. Cl............................................. B32b 31/00

[58] Field of Search .......... 156/497, 498, 510, 512, 156/267, 282, 82, 259, 260, 211; 117/4

[56] References Cited
UNITED STATES PATENTS

| | | | |
|---|---|---|---|
| 3,591,908 | 7/1971 | Pepmeier........................ | 156/497 |
| 2,997,098 | 8/1961 | Ricse et al. ..................... | 156/497 |
| 2,678,679 | 5/1954 | Bergstein........................ | 156/82 |
| 3,461,017 | 8/1969 | Fecher et al..................... | 156/498 |
| 3,481,051 | 12/1969 | Davis Jr. ........................ | 156/497 |
| 3,580,788 | 5/1971 | Gustafson....................... | 156/497 |

FOREIGN PATENTS OR APPLICATIONS 1,003,203   9/1965   Great Britain....................... 156/82

Primary Examiner—Ralph S. Kendall
Assistant Examiner—M. F. Exposito
Attorney, Agent, or Firm—Johnston, Keil, Thompson & Shurtleff

[57] ABSTRACT

Apparatus which welds cut lengths of a thermoplastic film-tube in the manufacture of sealed sacks, said apparatus including: motor-driven guide members such as a pair of metal bands which grip a flat length of the tube transversely just below a cut open end thereof to provide front and rear side edges of the tube projecting from the guide members a distance approximately equal to the intended breadth of the weld, said guide members being arranged to advance the resulting projecting or exposed two-layer strip of tube end-face edges through the welding apparatus; a resistance member to contact the advancing strip to fold open its front side edge or leading edge as it is being advanced; knife means in the path of the advancing strip to cut it first at its front side edge and subsequently at its rear side edge; guide plate means to then fold apart the advancing strip; heating means to heat the inner surfaces of the folded apart strip to a fusing temperature; and finally means to press the two-layer strip back together to complete the weld.

10 Claims, 6 Drawing Figures

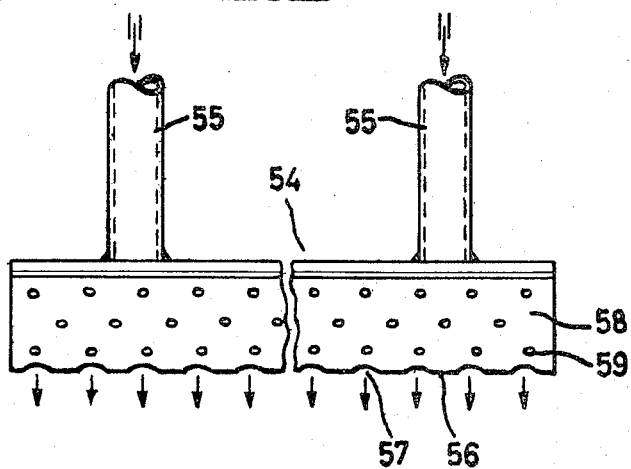
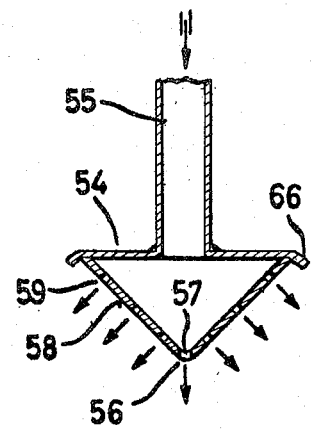
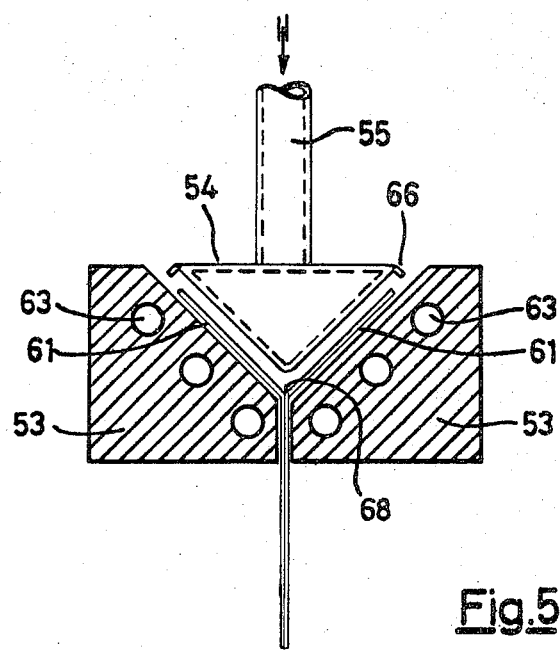

MANUFACTURE OR CLOSING OF SACKS BY WELDING CUT LENGTHS OF TUBE OF THERMOPLASTICS

It is an object of the present invention to provide an apparatus to carry out a welding process which makes it possible for the films which are to be welded to be fused at their inner surfaces and for the edge zone of the weld which faces the sack optionally to be provided with thickening. In order to make the inner surfaces of the films to be welded accessible to the heat carrier, it is necessary to ensure that the lengths of tube are reliably cut open over a length corresponding to the breadth of the weld.

In a process for the manufacture or closing of sacks by welding cut lengths of tube of thermoplastics by means of hot air, this object is achieved, in accordance with the invention, by guiding the flat cut length of tube by guide members, cutting it off straight on the side which is to be welded and which projects beyond the plane formed by the guide members and pressing it, with the edge produced by laying it flat and laying at the front with reference to the operating direction, against a resistance member, successively cutting open said front edge of the cut length of tube, which has been pressed by the resistance member to give a flat triangular surface, over a length corresponding to the breadth of the weld, bending apart the two strips of sheeting produced by cutting open in a V-shape in the breadth of the weld, fusing the two inner surfaces of the strips by applying hot air with simultaneous cooling of the outer surfaces of the strips, bringing the strips together at their fused inner surfaces by means of externally applied compressed air and welding them from the outside under pressure, and cooling the resulting weld from both sides by means of a stream of cooling air until it has consolidated. The amount of hot air applied to the inner surfaces of the film strips which have been bent in a V-shape may be increased toward the base of the weld.

It is known to weld cut lengths of tube of a thermoplastic film continuously by applying the requisite heat by means of hot air from the outside onto the sheets which rest on one another in the area of the weld which is to be formed. For this, the film sections which are to be welded are gripped by travelling steel bands and transported, while being pressed together, to the successive treatment stations, where they are first heated at the place to be welded by means of heated compressed air and welded together by the pressure of the externally applied compressed air. On its subsequent passage through ambient air the welds are briefly cooled from the outside and mechanically pressed against one another in such a way that those points of the weld where a bond has formed are welded together completely. Finally, the sheet sections, in the welded state, are ejected at the end of the conveying steel bands.

Such a method of hot air welding, in which the heat has to be conveyed from the outside of the sheeting to the weld position which is located on the inside, suffers from the fundamental disadvantage that the hot air has to be warmed to relatively high temperatures because of the poor heat conductivity of the plastic sheeting and that as a result the sheeting can easily be damaged by heat, especially if relatively thick sheets are to be welded together. A further disadvantage of the known hot air welding process resides in the fact that as a result of the mechanical consolidation of the weld which is effected by means of knurled rollers the edge zones of the weld are frequently weakened by notching, so that when the sack is subjected to impact stresses it is possible for the weld to burst open at the lower edge of the weld.

To carry out the welding process according to the invention, an apparatus is used in which one laid-flat length of tube at a time, of appropriate length, is cut off straight at one of its open ends and is gripped by motor-driven guide members which face one another, in such a way that the front and rear edges of one of the open ends of the cut length of tube project relative to the guide members by an amount approximately corresponding to the breadth of the weld, and the cut length of tube is passed through the welding apparatus with the aid of the guide members, and which according to the invention is characterized in that above the plane formed by the guide members, in the region of the projection of the front and rear edges of the cut length of tube, a resistance member is provided, that downstream of the resistance member there is arranged a knife fixed in a knife holder an having its point of engagement set at a height between the resistance member and the upper edge of the guide members, that guide plates for folding apart the cut film strips are provided downstream of the knife, that support jaws, provided with channels for the passage of a cooling medium, for receiving the folded-open film strips, and a hollow welding prism, which projects from above into the space between the folded-open film strips is capable of being fed with hot air and is provided with perforations for the discharge of the hot air, are provided downstream of the guide plates, that knurled rollers for bringing together the film strips which have been fused on the inner surfaces are provided downstream of the welding prism, and that cooling jaws provided with slits for supplying cooling air are provided downstream of the knurled rollers on both sides of the film strips which have been brought together.

In another ambodiment of the apparatus according to the invention the guide members are constructed as metal bands driven via rollers, the knife is designed as a rotating disc, and the guide plates provided downstream of the knife are combined with the knife holder to form a single unit.

In order to achieve uniform fusing of the inner surfaces of the film strips which subsequently form the weld, the welding prism which projects from above into the V-shaped space between the folded-open film strips is arranged with its wedge flanks at only a small distance from the folded-open film strips. A sufficient accumulation of hot air for the fusing of the inner sufaces of the film strips can for example be achieved by providing each of the two wedge flanks of the welding prism, outside the region of the folded-open film strips, with a barrier ridge which projects into the gap formed by the wedge flank and the film strip resting against the support jaw and runs parallel to the tip of the welding prism. The perforations in the welding prism for the discharge of hot air are arranged along the tip of the welding prism and distributed over the flanks of the welding prism. If it is desired to form a thickening at the base of the weld, then this can be effected by controlling the amount of hot air, by choosing the total cross-sectional area of the perforations which are provided along the welding prism tip to be greater than the total cross-sectional area of the perforations distributed over the welding prism flanks.

In order that, after fusing the inner surface of the film strips which have been folded open in a V-shape, the strips are brought together, provision is made for the support jaws to be extended beyond the end of the welding prism, viewed in the working direction, and for the extended support jaws to be provided with supply lines and for the flanks of the extended support jaws which face the film strips to be provided with perforations for the compressed air used for raising the film strips and bringing them together.

The process according to the invention and the apparatus according to the invention are described in more detail below with the aid of an embodiment of a welding apparatus, represented in the drawing.

Figure 6:
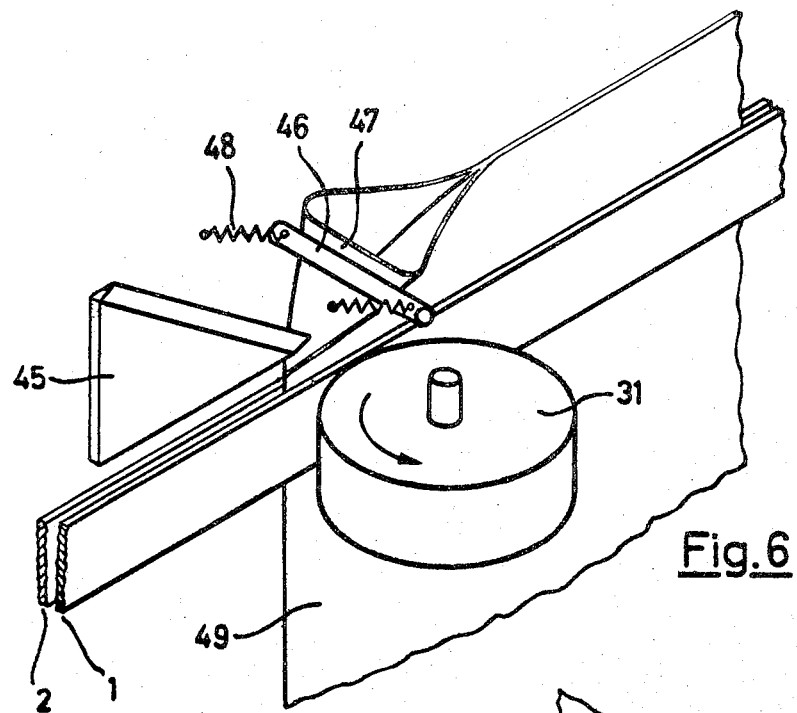
Figure 2:
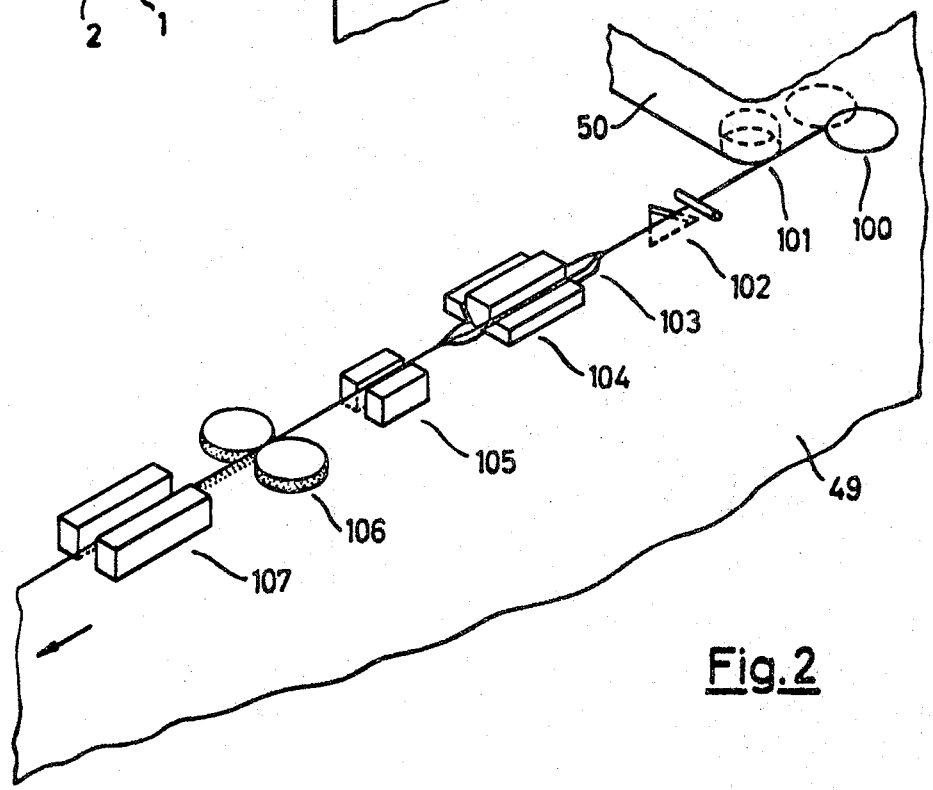

The figures of the drawing provide the following:

FIG. 1 is a perspective overall representation of the welding device,

FIG. 2 is a perspective diagrammatic representation of the individual operating stations lying behind one another in the working direction, FIG. 3 is a side view of the welding prism, FIG. 4 shows a cross-section through the welding prism, FIG. 5 shows a cross-section through the support jaws with the film strips resting thereon and a side view of the welding prism which projects from above into the space between the folded-open film strips, and FIG. 6 diagrammatically shows the input section of the welding device in perspective, with a cut length of tubular film passing into the device.

FIG. 2 is a three-dimensional representation of the individual successive stations for cutting 100 the cut length of tubular film 49, ejecting 101 the trim strip 50, slitting open 102 the film and folding open 103 the film strips, fusing 104, straightening and bringing together 105, knurling 106 the film strips and cooling 107 the weld. As shown in FIG. 2, the individual cut lengths of tube, standing vertically, are cut off at the upper edge by a pair of cutting rollers after having been drawn into the device by a pair of bands 1, 2 which clamps the film. The resulting trim strip is ejected. The cut length of tubular film is slit open at its front edge and rear edge so that two film strips resting against one another, of a breadth corresponding to the subsequent weld, are produced. These two film strips are folded apart in a V-shape until they rest against support jaws, and are subjected to hot air on the inside by means of a welding prism. After the inner surfaces of the film strip have been fused, the strips are straightened again and brought together, and pressed against one another by knurled rollers. The film strips are thus welded together and are thereafter cooled by means of air until they have finally consolidated, and are subsequently ejected from the apparatus.

The apparatus according to the invention is represented in detail in FIG. 1. The individual parts of the device are carried or arranged in a box-shaped frame which, for the sake of clarity, has not been shown in the drawing.

The tubular film which is to be welded at its upper edge is drawn into the apparatus by means of a pair of metal bands 1 and 2 and is transported through the apparatus between these bands. For this purpose, the metal band 1 is passed over guide rollers 3 and 4 which are carried on the shafts 5 and 6, and the metal band 2 is correspondingly passed over guide rollers 7 and 8 which are carried on the shafts 9 and 10. The requisite tension in the metal bands 1 and 2 is set up by a pair of tension rollers 11, 12 and 13, 14 respectively. The metal bands 1 and 2 are driven by means of the gear motor 15 and the pair of bevel gears 16, 17. The bevel gear 17 is fixed to a shaft 18 which inter alia carries the belt pulley 19, which in turn transmits the rotation of the shaft 18 via the belt 20 to the belt pulley 21 fixed to the shaft 9 and in this way drives the metal band 2. The shaft 18 further carries the gearwheel 22, which engages with the gearwheel 24 fixed to the shaft 23. A belt pulley 25 is again provided on the shaft 26 to the belt pulley 27 fixed to the shaft 5 and in this way drives the metal band 1. The belts 20 and 26 are tensioned by means of the tension rollers 28 and 29. The sections of the metal bands 1 and 2 which face one another are laterally pressed against one another are laterally pressed against one another by means of two pairs of pressure rollers 30, 31 so that the cut length of tubular film located between the sections of the band is firmly held and safely guided through the device.

After having been drawn into the apparatus by means of the pair of metal bands 1, 2 the cut length of tubular film is passed to the cutting rollers 34 and 35 mounted above the metal bands 1, 2 on the shafts 32 and 33, and these trim the cut length of tubular film straight at the upper edge. For this purpose, the cutting rollers 34 and 35 are driven in opposite directions, the cutting roller 34 being driven via the belt pulley 36 fixed to the shaft 32, the belt 37 and the belt pulley 38 fixed to the shaft 18, and the cutting roller 35 being driven via the gearwheels 39 and 40 fixed on the shafts 32 and 33 and engaging with one another. The ejection of the trim strip produced is carried out by means of two wheels 41 and 42 mounted on the shafts 32 and 33 above the cutting rollers 34 and 35 and the ejector band 44 which passes around these wheels and a guide roller 43, the trim strip being clamped between the ejector band 44 and the wheel 41 and carried outwards.

The cut length of tube which has been cut off straight and squeezed flat by the metal bands now passes to the slitting-open station, in which the edge which is at the front, in the working direction, and the edge which is at the back, in the working direction, are each cut open over a length corresponding to the breadth of the weld to be made. An essential characteristic of the invention now consists (see also FIG. 6) in providing, shortly upstream and just above the cutting knife 45, which is fixed in a knife holder 52 and arranged at the upper edge of the metal bands 1, 2, a resistance member 46, for example constructed as a pin, which folds open the front edge of the cut length of tubular film 49, which strikes the resistance member, to give a surface 47 which can be reliably slit open by the cutting knife 45 arranged downstream, since it has been found that the front edge of the cut length of tubular film frequently passes by the cutting knife 45, without the tubular film being slit open, if a resistance member is not used. The resistance member 46 is advantageously suspended in a sprung manner by means of a spring element 48, so that when the front edge of the cut length of tubular film 49 has been folded open the resistance member can move out of the way upwards and only returns to its starting position after the cut length of tubular film has travelled past it. The cutting knife 45 can for example be constructed as a pointed knife, as a rotating cutting disc or as a heated fusing pin.

After the front and rear edges of the cut length of tubular film have been slit open, the resulting film strips 60, 61 (FIG. 5) are folded apart in a V-shape. This is done by the guide plates 51, which are arranged downstream of the knife 45 and can be grouped together with the knife holder 52. The film strips which have been folded apart in a V-shape are received by support jaws 53 (see also FIG. 5) against which the film strips 60, 61 rest with their outer surface. A welding wedge 54 projects from above into the space between the folded-open film strips, the wedge being constructed hollow and being fed via inlet connections 55 with compressed air which issues from the perforations 57 arranged along the tip 56 of the welding prism and from the perforations 59 distributed over the welding prism flanks 58, in a direction towards the inner surfaces of the film strips 60, 61. The heating of the compressed air to the temperature required for the fusing of the inner surface of the film strips 60, 61 can for example be effected by the electrical sleeve heaters 62 provided on the inlet connections. Whilst the inner surface of the film strips 60, 61 are being heated and fused, the outer surfaces of the film strips, which are pressed against the support jaws by the stream of hot air, must be cooled so as to prevent fusing of the outer surfaces of the film and hence adhesion to the support jaws. For this purpose, the support jaws 53 are pervaded by channels 63 for the passage of a cooling medium, which is respectively introduced and removed via the connections 64 and 65.

In order to achieve rapid and gentle heating of the inner surfaces of the film strips 60, 61, the welding prism flanks 58 are firstly arranged at a small distance, i.e., 0.5–20 mm, preferably about 3 mm, from the inner surface of the film strips, and are secondly provided with a barrier ridge 66 which projects outside the region of the folded-open film strips 60, 61 into the gap 67 formed by the welding prism flank 58 and the support jaw 53.

The last-mentioned measure achieves an accumulation of heat which makes it possible to keep the temperature of the hot air supplied via the welding prisms 54 only a few degrees above the melting point of the plastic employed as the film, so that the inner surfaces of the film strips 60, 61 are fused extremely gently, without the outer surfaces of the film strips being softened.

In the case of plastic sacks where there is a risk of the weld being subjected to excessive load during handling and transportation, so as to tear open at the transition between the weld and the sack film, a thickening of material can be provided by means of the apparatus according to the invention, during the welding process, at the particularly critical transition point between the weld and the sack film. For this purpose, the cross-sections of the perforations 57 and 59 in the welding wedge 54 are so correlated to one another that the major proportion of the hot air passed to the welding wedge via the inlet connections 55 issues through the perforations 57 at the welding prism tip 56, so that particularly intensive heating of the weld base 68 occurs. As a result of this greater heating of the weld base 68 an accumulation of fused film material is achieved through the more pronounced film shrinkage at this point, and this accumulation leads to a thickening of material after the weld has cooled. It has been found that welds with such a thickening of material withstand far greater stresses at the transition point between the weld and the sack film than the hitherto known welds of uniform thickness, which frequently are additionally weakened in just this critical transition area as a consequence of the treatment with knurled rollers.

After the fusing of the inner surfaces of the film strips 60, 61, the film strips which are folded open in a V-shape must now be straightened again and brought together. For this purpose, the support jaws 53 are extended beyond the end of the welding wedge 54 and constructed as nozzles 69 which are fed with compressed air via the connections 70, this compressed air impinging on the outer surfaces of the film strips 60, 61 and straightening and compressing these. Two knurled rollers 71 and 72 fixed to the shafts 18 and 23, which consolidate the weld by mechanical pressure from the outside, are provided downstream of the nozzles 69. The notching and weakening of the transition point between the weld and the sack film as a result of the machanical pressure of the knurled rollers 71 and 72 is avoided by the thickening of the weld base 68, described above. Finally, cooling jaws 73 and 74 are provided on both sides of the weld downstream of the knurled rollers 71 and 72. These cooling jaws 73 and 74 are provided with connections 75 for the introduction of cooling air and above the metal bands 1 and 2 passes longitudinal slits 76 which guide the cooling air onto the outside of the weld of the cut length of tubular film.

It has been found that with this arrangement the most intensive cooling action is achieved if the slits 76 from which the cooling air issues are directed in a downwardly sloping direction towards the base of the weld. After cooling, the cut length of tubular film which has been welded at the upper edge is ejected from the apparatus.

The advantage of the apparatus and process according to the invention over the previously known apparatus and methods of film welding reside in particular in the fact that the plastic film introduced in the form of a cut length of tubular film into the welding apparatus is cut open practically without miscuts and that the subsequent fusing of the inner surfaces of the resulting film strips takes place gently and economically as regards power consumption. As a result of the fact that when the hot air impinges directly onto the inner surfaces of the film strips, the temperature of the hot air only has to be a few degrees above the melting temperature of the plastic film used, damage to the film material at, and in the vicinity of, the weld is excluded. It has for example been found that the temperature of the hot air in welding a polyethylene film with a softening point of 130°C merely has to be about 170°C if the process according to the invention is used, whilst in the same case hot air temperatures of 350° to 380°C are required for hot air welding from the outer surfaces of the film strips. Additionally, the apparatus according to the invention permits a relatively high welding speed and yields welds of high mechanical strength. The apparatus according to the invention is distinguished as compared with the known hot air welding machines especially through a very simple and compact construction.

We claim:

1. Apparatus for welding cut lengths of a thermoplastic film tube in the manufacture of sealed sacks which comprises:

motor-driven guide members facing one another to grip a flat length of the tube, which is cut open at one end transversely to the front and rear side edges thereof, in such a way that said front and rear side edges project from the guide members by an amount approximately equal to the intended breadth of the weld, said guide members being adapted to advance the resulting projecting two-layer strip formed by the exposed end-face edges through the welding apparatus;

a resistance member mounted laterally in the path of the projecting two-layer strip to contact the front side edge thereof as the strip is being advanced by said guide members and to fold open said front side edge of said strip;

knife means mounted next to the resistance member in the path of the advancing strip with its point of cutting engagement set at a position between said resistance member and said guide members to first cut the projecting two-layer strip at its folded open front side edge and subsequently at its rear side edge;

guide plate means following said knife means in the path of the advancing strip to fold apart the two-layer strip;

heating means following said guide plate means in the path of the advancing strip to heat the inner surfaces thereof after they are folded apart to a fusing temperature; and means to press the heated two-layer strip back together and to cool and strip to complete the weld.

2. Apparatus as claimed in claim 1 wherein said guide plate means includes a holder for said knife means.

3. Apparatus as claimed in claim 1 wherein said heating means comprises a heatable hollow welding prism mounted to project into the space between the folded apart layers of the strip and support jaws having cooling channel means to receive and guide the folded apart layers of the strip on their outer surfaces as heat is applied by the welding prism to their inner surfaces.

4. Apparatus as claimed in claim 3 wherein said means to press the heated two-layer strip back together comprises a pair of knurled rollers and said means to cool the strip to complete the weld comprises a second set of jaws with slits to supply cooling air on both sides of the two-layer strip.

5. Apparatus as claimed in claim 3 wherein the flanks of the welding prism are positioned at a small distance of about 0.5 to 20 mm. from the folded apart layers of the strip.

6. Apparatus as claimed in claim 3 wherein said welding prism includes a barrier ridge extending longitudinally parallel to the prism tip on each side of the prism and projecting into a gap space formed between the outer walls of the prism and opposing parallel supporting walls of said jaws, said ridges being placed outside of the region occupied by the two folded apart layers of the strip.

7. Apparatus as claimed in claim 3 wherein said heating means includes a supply conduit for hot air into the interior of the hollow welding prism which is provided with perforations for the discharge of hot air onto the two folded apart layers of the strip.

8. Apparatus as claimed in claim 7 wherein said perforations for the discharge of hot air are arranged along the welding prism tip and also distributed over the welding prism flanks.

9. Apparatus as claimed in claim 8 wherein the total cross-sectional area of the perforations provided along the welding prism tip is greater than the total cross-sectional area of the perforations distributed over the prism flanks.

10. Apparatus as claimed in claim 3 wherein said support jaws extend longitudinally beyond the end of the welding prism in the path of the advancing strip and include means to direct compressed air through perforations in the supporting surfaces of the jaws to straighten and guide together the heated layers of the strip where they rest on said jaws in the region adjacent the welding prism.

* * * * *